United States Patent [19]

Morishima

[11] 4,421,418

[45] Dec. 20, 1983

[54] CLOCK ADJUSTMENT SWITCH SYSTEM

[75] Inventor: Hideki Morishima, Saitama, Japan

[73] Assignee: Rhythm Watch Co., Ltd., Tokyo, Japan

[21] Appl. No.: 364,678

[22] Filed: Apr. 2, 1982

[30] Foreign Application Priority Data

| | | | |
|---|---|---|---|
| Apr. 6, 1981 | [JP] | Japan | 56-50012[U] |
| Apr. 9, 1981 | [JP] | Japan | 56-51789[U] |
| Apr. 10, 1981 | [JP] | Japan | 56-52462[U] |

[51] Int. Cl.[3] .......... G04C 17/00; G04C 9/00; G06F 3/14

[52] U.S. Cl. .......... 368/69; 368/187; 368/239; 340/712

[58] Field of Search .......... 368/69-70, 368/82-84, 67, 185-187, 227, 239-242; 340/365 C, 711-712; 200/DIG. 1, DIG. 2

[56] References Cited

U.S. PATENT DOCUMENTS

| | | | |
|---|---|---|---|
| 3,940,920 | 3/1976 | Nakamura et al. | 368/21 |
| 4,068,465 | 1/1978 | Bacon | 368/82 |
| 4,121,204 | 10/1978 | Welch et al. | 340/365 C |
| 4,194,196 | 3/1980 | Mohiuddin | 368/29 |
| 4,322,833 | 3/1982 | Husted | 368/69 |

*Primary Examiner*—Vit W. Miska
*Attorney, Agent, or Firm*—Koda & Androlia

[57] ABSTRACT

A clock adjustment switch system for a clock having a display panel, such as an optoelectronic or liquid crystal display panel, and a transparent cover fit over the display panel. Transparent touch-switches for adjusting the timekeeping or other function of the clock are provided on the transparent cover and luminous indicator means are provided at corresponding positions on the display panel. The time switches are made operative and the luminous indicator means are lit only when the clock adjustment function has been made operative by another switch provided on the transparent cover.

6 Claims, 15 Drawing Figures

CLOCK ADJUSTMENT SWITCH SYSTEM

BACKGROUND OF THE INVENTION

1. Field of the Invention

This invention relates to a clock adjustment switch system and more particularly to a clock adjustment switch system which is producible at low cost, enhances the fashionability of the clock display and improves the operability of the clock.

2. Description of the Prior Art

In conventional clocks having optoelectronic displays there has been used a mechanically-operated clock adjustment switch system. This type of switch system is disadvantageous not only from the point of cost but also from the point of the difficulties encountered with such a system in assembling the clock and in realizing a waterproof structure.

An improved clock adjustment switch system employing touch-switches provided on the upper surface of the clock display panel has been proposed. Although this improvement eliminates the problems of the mechanical switch system, it gives rise to a problem of its own. Namely, with the conventional touch-switch system it has been a common practice to indicate the position of the touch-switches by coloring the terminals thereof or by printing or otherwise affixing marks on the display panel. When these methods are used, the colored portions or the marks indicating the positions of the touch-switches remain visible at all times, even when the clock adjusting switches are not being used. As a consequence, the clock display has a cluttered appearance.

SUMMARY OF THE INVENTION

One object of the present invention is to provide a clock adjustment switch system which overcomes the aforesaid drawbacks of conventional clock adjustment switch systems.

Another object of the present invention is to provide such a clock adjustment switch system which is inexpensive to manufacture and which improves the fashionability and operability of the clock in which it is incorporated.

In order to realize these objects, the present invention provides a clock adjustment switch system wherein means for indicating the positions of clock adjustment touch-switches are lit only when the clock adjustment switches are operative and a clock adjustment switch control means for selectively making the clock adjustment touch-switches operative or inoperative is also constituted of one or more touch-switches, the position and the state of which are indicated by optoelectronic display elements. Therefore, in accordance with the present invention, since both the clock adjustment switches and the clock adjustment switch control switches are constituted of touch-switches, the clock adjustment switch system can be manufactured inexpensively, the waterproof characteristics of the clock into which the system is incorporated can be improved, and the otherwise required numerous switch position indicators which tend to give the clock display a cluttered appearance can be eliminated. Moreover, since the state of the clock adjustment switch control means can also be determined from the state of display elements, the appearance of the clock display is made more fashionable and the operability of the clock is improved.

DESCRIPTION OF PREFERRED EMBODIMENTS

The present invention will hereafter be described in further detail with reference to the drawings.

Figure 1:
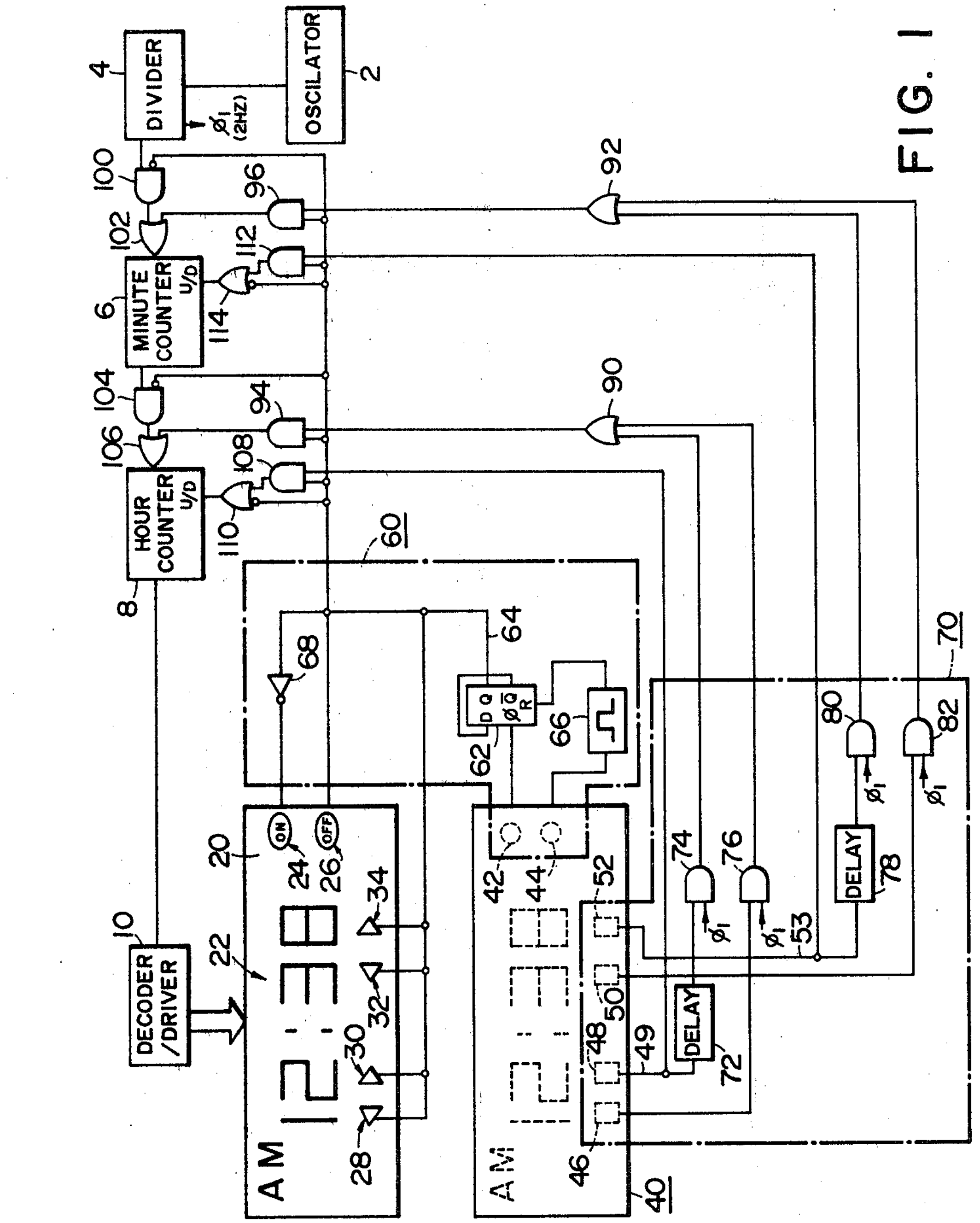
FIG. 1 is a circuit diagram of a digital clock incorporating an embodiment of this invention.

FIG. 1 shows the circuitry of a digital clock incorporating a first embodiment of the present invention. The time display 22 appearing on an optoelectronic display panel 20 is produced by a known combination of an oscillator 2, a divider 4, a minute counter 6 capable of counting up or down, an hour counter 8 capable of counting up or down and a decoder/driver 10.

By the numeral 60 is denoted a clock adjustment switch control means for making the clock adjustment switches operative or inoperative. The clock adjustment switch control means 60 is operated by switches 42 and 44 which are constituted of a pair of transparent touch-switches provided on a transparent glass cover 40 which covers the display panel 20. At positions on the display panel 20 corresponding to the positions of the switches 42 and 44 are provided first luminous indicator means 24 and 26 for indicating the positions of the switches 42 and 44 and for indicating the state of these switches. Normally, i.e. when the clock adjustment switches are not being operated, only the first indicator 24 is lit to display the indication ON so as to indicate the position of the transparent touch switch 42 and to show that the clock adjustment switches are in their inoperative state. If, with the watch in this condition, the user touches the switch 24, the switch 24 operates to cause the Q output on the output line 64 of a flip-flop circuit 62 to become H, thus making operative the clock adjustment function of a clock adjustment switch means 70 (to be described later) and causing the first indicator 26 to light and display the indication OFF. At the same time, second luminous indicator means 28, 30, 32 and 34 on the display panel 20 are lit to indicate the positions and functions of clock adjustment switches 46, 48, 50 and 52 (to be described later) for independently setting the hour reading and the minute reading either ahead or back. With the lighting of the second luminous indicators 28, 30, 32 and 34, the user is able to locate the positions of the clock adjustment switches 46, 48, 50 and 52 which up till then have not been visible. This is because the clock adjustment switches 46, 48, 50 and 52 are themselves transparent touch-switches provided on the glass cover 40 so that their positions can be determined only when the second luminous indicators 28, 30, 32 and 34 located at corresponding positions on the display panel 20 are lit. The switch 48 is for setting the hour reading ahead, while the switch 46 is for setting the hour reading back. More specifically, when the user operates the switch 48 by touching it, the output on line 49 becomes H, whereby an H signal is supplied to the up/down discrimination terminal U/D of the hour counter 8 via the AND gate 108 and the OR gate 110, making it possible for the hour counter 8 to count up. If the time-setting switch 48 is maintained ON (if the operator continues to touch it), a 2 Hz pulse signal will be output from an AND gate 74 and forwarded through an OR gate 90, an AND gate 94 and an OR gate 106 to the hour counter 8 as a setting pulse for advancing the hour reading. On the other hand, if the user touches the switch 46, since the AND gate 108 remains closed, an L signal is supplied to the up/down discrimination terminal U/D so that a 2 Hz pulse signal from an AND gate 76 causes the hour counter 8 to count down, setting back the hour reading. The switches 52 and 50 are for setting the minute reading ahead and back, respectively. When the switch 52 is operated, the output on line 53 becomes H to that an H signal is supplied to the up/down discrimination terminal U/D of the minute counter 6 via an AND gate 112 and an OR gate 114, making it possible for the minute counter 6 to count up. A 2 Hz pulse signal from an OR gate 62 is then supplied through an AND gate 96 and an OR gate 102 to the minute counter 6 as a setting pulse for advancing the minute reading. On the other hand, when the switch 50 is operated, since the AND gate 112 remains closed, an L signal is supplied to the up/down discrimination terminal U/D so that a 2 Hz pulse signal from an AND gate 82 causes the minute counter 6 to count down, setting back the minute reading. Delay circuits 72 and 78 are provided in the clock adjustment switch means so that, in the case of setting the hour or minute reading ahead by causing the hour counter 8 or the minute counter 6 to count up, the H signal will be supplied to the respective up/down discrimination terminal U/D before the 2 Hz time-setting pulse is input to the counter 8 or 6.

When the clock adjustment switch control means 60 is operated to make the clock adjustment function inoperative, the Q output on line 64 of flip-flop 62 becomes L so that an H signal is supplied to the U/D terminals of the hour counter 8 and the minute counter 6 via the OR gates 110 and 114, causing the counters 8 and 6 to be held in their up-count states.

Also, the arrangement is such that when the clock adjustment switch control means 60 is in this inoperative state, a carry signal can be forwarded from the minute counter 6 to the hour counter 8 through an AND gate 104, and a standard 1/60 Hz signal (1-minute signal) can be forwarded from the divider 4 to the minute counter 6 through an AND gate 100.

Next it will be explained how the clock adjustment switches once made operative are changed back to their original inoperative state. This the user of the clock does by touching the switch 44 located at a position corresponding to that of the OFF indicator element 26 of the first luminous indicator means. More specifically, when the user touches the switch 44, this causes a reset pulse from a one-shot circuit 66 to be supplied to the R terminal of the flip-flop 62, whereby the Q output on line 64 becomes L. As a result, the ON indicator element 24 of the first luminous indicator means is turned on through an invertor 68 and the second luminous indicator means 28, 30, 32 and 34 are turned off. Also, since the Q output on line 64 becomes L, the AND gates 94 and 96 are retained in their closed states, making the clock adjustment switches 46, 48, 50 and 52 inoperative and extinguishing the second luminous indicator means 28, 30, 32 and 34 (which are not required when the clock adjustment function is inoperative). As a result, the cluttered appearance of the display panel 20 caused by the lighting of the luminous indicator elements is transformed back to the original neat appearance. Moreover, as the ON indicator element 24 of the first luminous indicator means is now lit, the user is easily able to tell that the clock adjustment function of the clock is now in the inoperative state.

The displays appearing on the optoelectronic display panel 20 and manner of operating the touch-switches in the embodiment described above will now be explained with reference to FIGS. 2–6.

Figure 2:
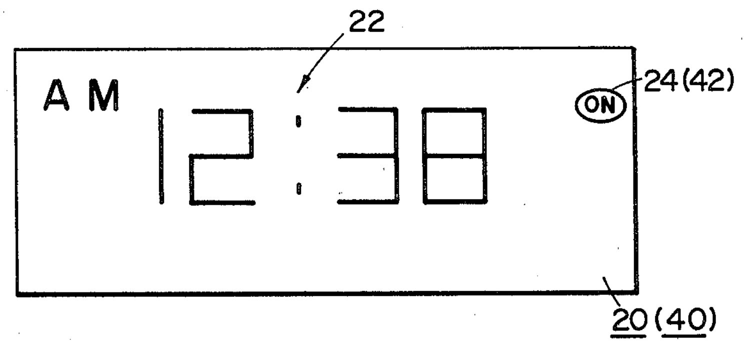
FIGS. 2–6 are explanatory views showing the display panel of the clock of FIG. 1 in various display states and in various states of the switches included therein.

The display shown in FIG. 2 is that which appears when the clock adjustment function is inoperative. Namely, on the display panel 20 there can be seen the time display 22 and the lit-up ON indication of the indicator element 24 of the first luminous indicator means.

Figure 3:
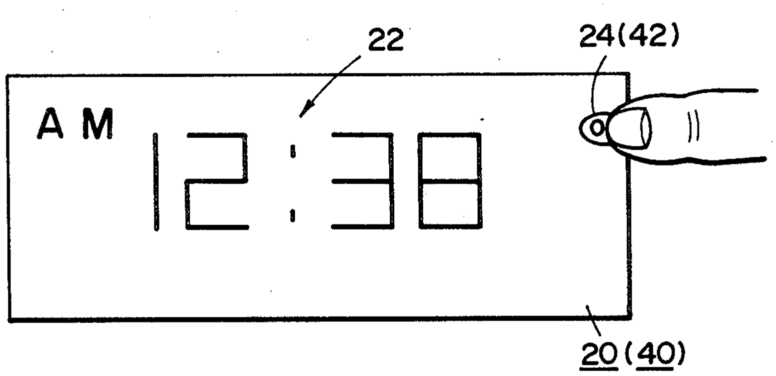

FIG. 3 shows the switch 42 located directly over the ON indicator element 24 being operated (by touch) in order to make the clock adjustment function of the clock operative.

Figure 4:
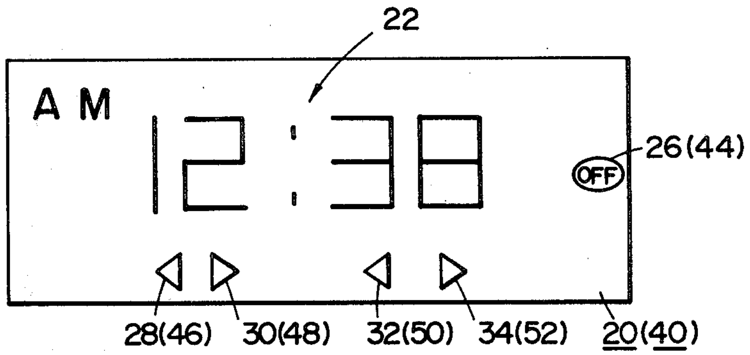

FIG. 4 shows the display that results from the operation shown in FIG. 3, namely the display at the time the clock adjustment function of the clock is operative. At this time, the OFF indicator element 26 and the second luminous indicator means 28, 30, 32 and 34 are lit.

Figure 5:
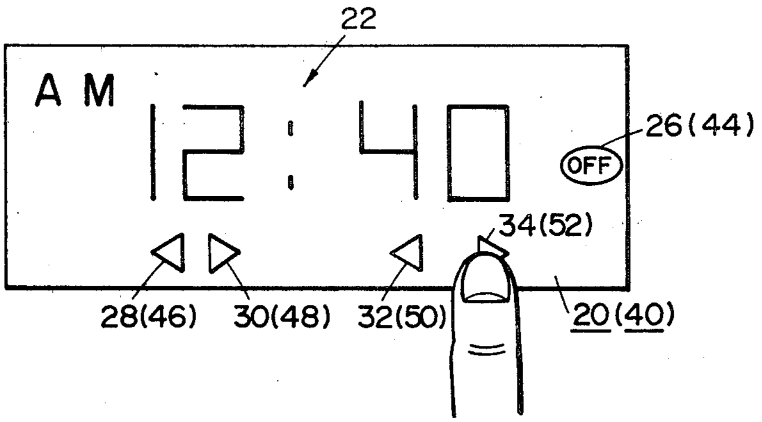

FIG. 5 shows the switch 52 located directly over the luminous indicator 34 (shaped to suggest setting ahead of the minute reading) being operated in order to set the minute reading ahead. As can be seen in the figures, the user has set the minute reading two minutes ahead.

Figure 6:
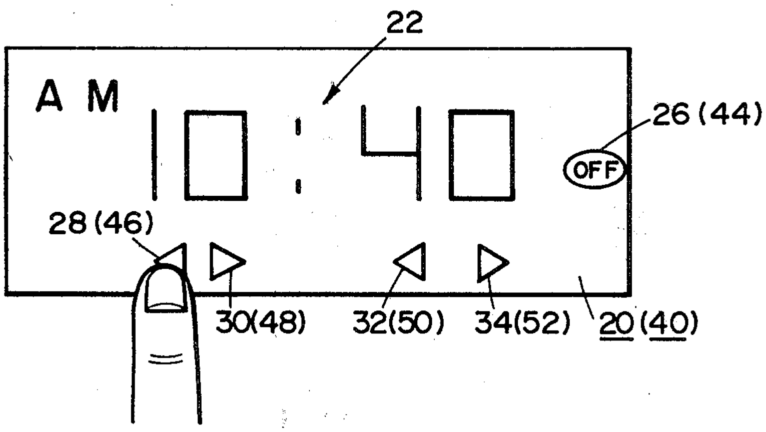

FIG. 6 shows the switch 46 located directly over the luminous indicator 28 (shaped to suggest setting back of the hour reading) being operated in order to set the hour reading back. As can be seen in the figures, the user has set the hour reading two hours back.

When the clock is in the state shown in FIGS. 5 and 6, it can be put back into the state where the clock adjustment function is inoperative by touching the switch 44 located over the OFF indicator element 26. When this is done, the display on the display panel 20 reverts to that shown in FIG. 2 (except for the displayed time).

Figure 7:
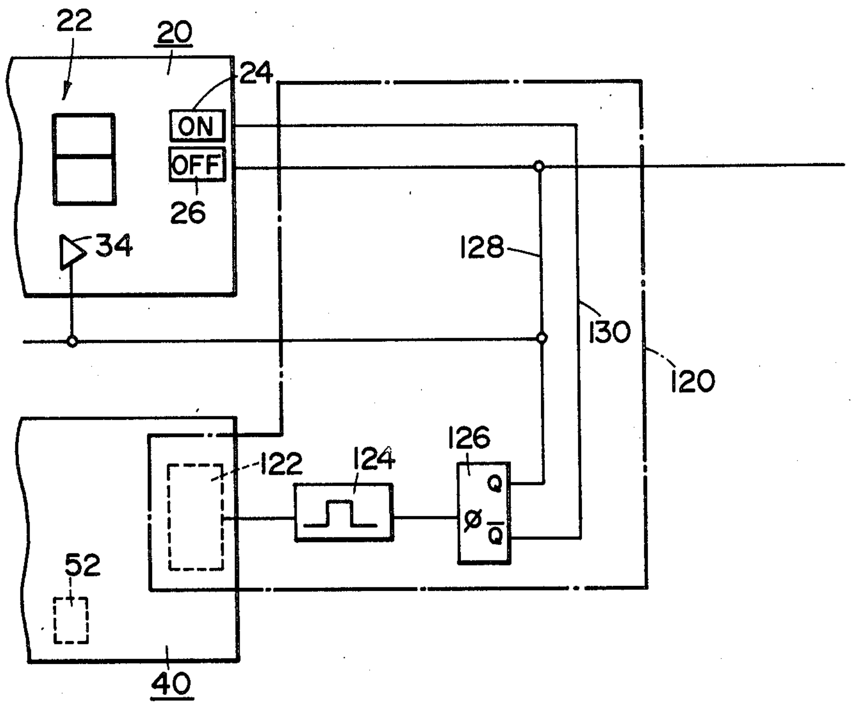
FIG. 7 is a circuit diagram of another example of the clock adjustment switch control means.

FIG. 7 shows another embodiment of the clock adjustment switch control means. Denoted by the reference numeral 120, the clock adjustment switch control means according to this embodiment comprises only a single transparent glass cover 40. More specifically, the switch 122 is formed sufficiently large to cover both luminous indicator means 24 and 26 located on the optoelectronic display panel 20. The Q output line 128 of a flip-flop 126 is connected to the OFF indicator element 26 and the second luminous indicator means 28, 30, 32 and 34, and the Q output line 130 thereof is connected to the ON indicator element 24. Therefore, by the operation of the single switch 122, the pulse output by a one-shot circuit 124 can be made to cause the output of the flip-flop 126 to switch back and forth between Q and $\overline{Q}$, thus alternately making the clock adjustment function of the clock inoperative and operative.

In this embodiment, the output line 128 corresponds to the output line 64 in the preceding embodiment.

Components of this embodiment which are the same as those in the preceding embodiment are indicated by like numerals and description thereof has been omitted.

This invention is not limited to the applications described in the embodiments explained above. It also includes the application of the same concept to the adjustment of clock functions other than the time-keeping function, and specifically can be applied to the calendar and alarm functions of a clock.

As described in the foregoing, the present invention provides a clock adjustment switch system for a clock wherein luminous optoelectronic means for indicating the positions of clock adjustment touch-switches are lit only when the clock adjustment switches are operative and a clock adjustment switch control means for selectively making the clock adjustment touch-switches operative or inoperative is also constituted of touch-switches, the position and state of which are indicated by optoelectronic display elements. Therefore, the clock adjustment switch system according to this invention is low in cost, provides for the extinguishment of unrequired indications on the display panel and has improved operability.

Figure 8:
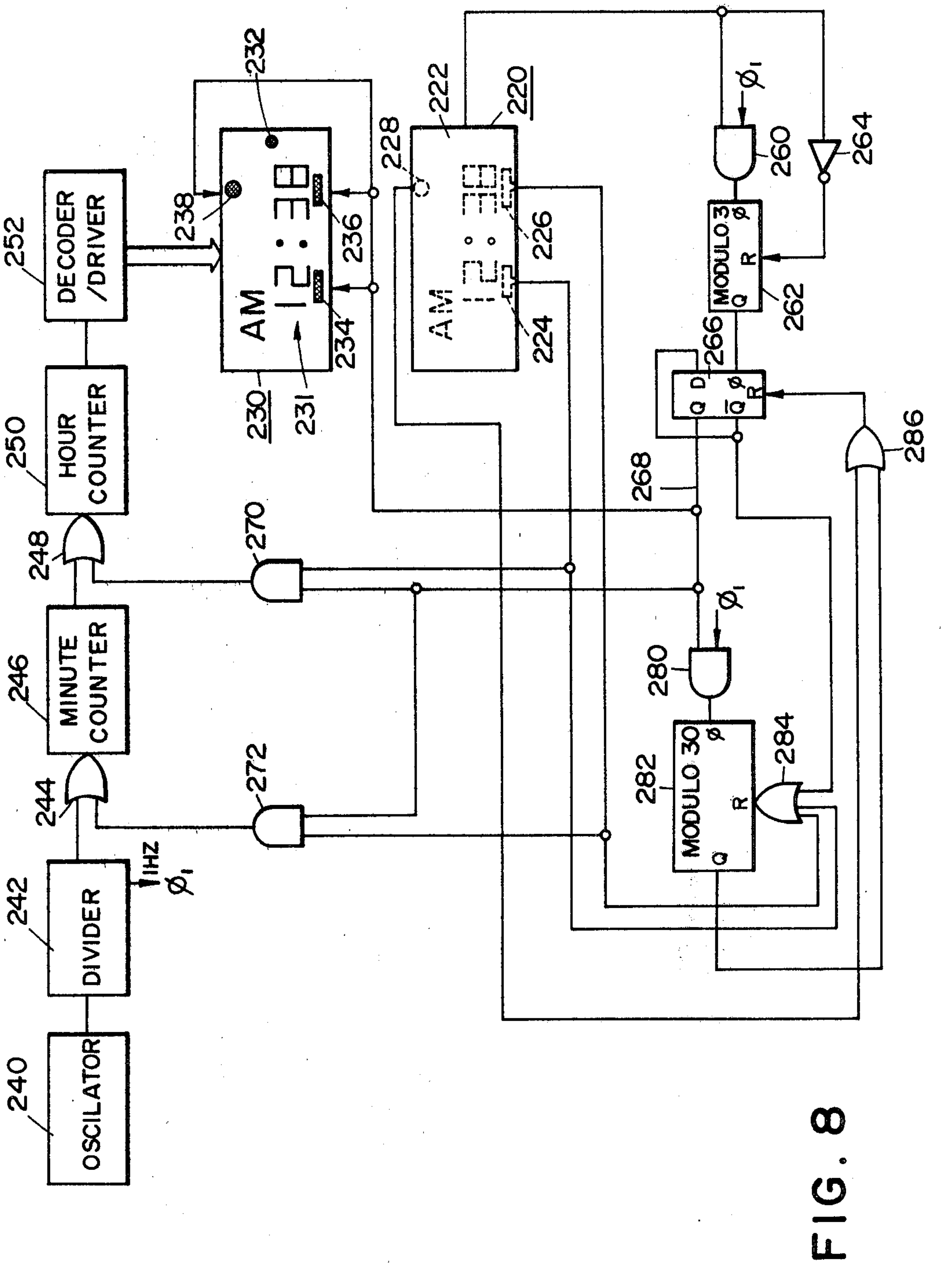
FIG. 8 is a circuit diagram of a clock incorporating another embodiment of this invention.

The circuit of another embodiment of the present invention is shown in FIG. 8.

The oscillator 240, divider 242, minute counter 246, hour counter 250 and decoder/driver 252 shown in this figure are of the type commonly used heretofore.

On a liquid crystal panel 230 are provided a time display section 231, an hour-setting switch position indicator element 234, a minute-setting switch position indicator element 236 and a lock-switch position indicator element 238. The liquid crystal panel 230 is further printed with an unlock-switch position indicator 232. On a glass cover 220 fit over the liquid crystal panel 230 there is provided at the portion falling directly above the unlock-switch position indicator 232 a touch-switch 222 for releasing the locked stated of the time-setting function. Moreover, at a portion of the glass cover 220 falling directly over the hour-setting switch position indicator element 234, there is provided an hour-setting touch-switch 224; at a portion falling directly over the minute-setting switch position indicator element 236, a minute-setting touch-switch 226; and at portion falling directly over the lock-switch position indicator element 238, a touch-switch 228 for locking the time-setting function.

In this embodiment, the touch-switch 222 is for unlocking the locked state of the time-setting function, thus making it possible to adjust the reading of the clock. The hour- and minute-setting switches and the lock-switch which makes it impossible to set the time are also touch-switches provided on the surface of the glass cover 220.

Figure 9:
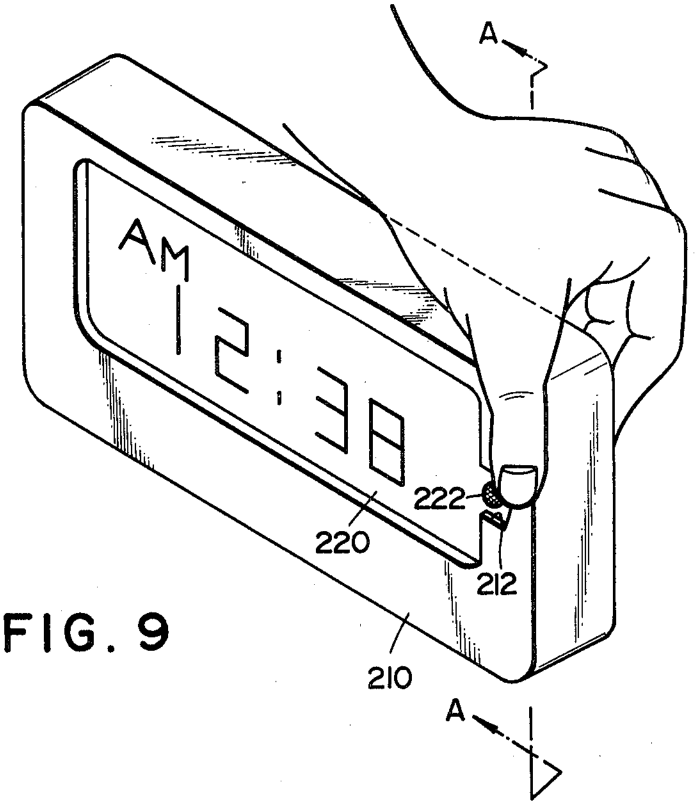
FIG. 9 is an external view of the clock of FIG. 8.
Figure 10:
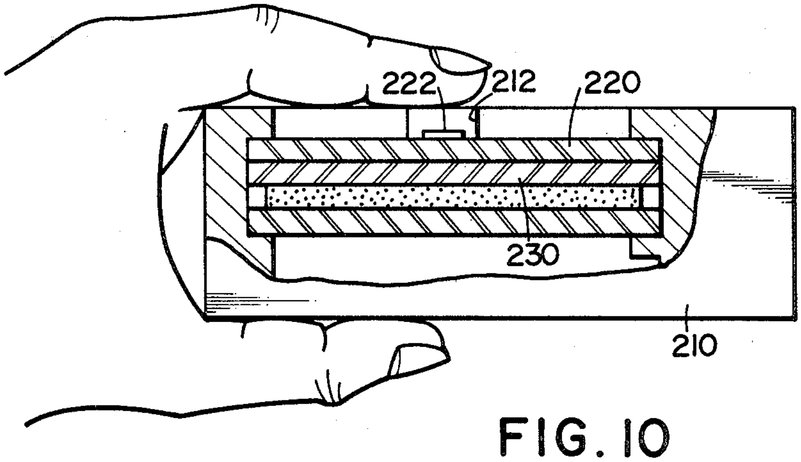
FIG. 10 is a cross-sectional view taken along line A—A of FIG. 9, FIGS. 11–13 are views showing states of display of the clock of FIG. 8.

FIG. 9 shows a perspective view of a clock having a clock adjustment switch system according to this invention and FIG. 10 is a cross-sectional view of the same clock taken along the line A—A in FIG. 10. The case 210 of the clock overlaps the periphery of the glass cover 220 fitted over the liquid crystal panel 230. The touch-switch 222 for controlling the clock adjustment function is provided in a notch 212 in the case 210. As can be seen from FIGS. 9 and 10, since the case 212 overlaps the periphery of the glass cover 220, the notch 212 is formed to a depth equal to the thickness of the case 212. Therefore, even if the user places one of his fingers over the notch 212 when picking up the clock, his finger will not come in touch with the touch-switch 222 unless he deliberately pushes the tip of his finger into the notch since in the ordinary manner of grasping the clock, his finger will be prevented from reaching the switch by the thickness of the case 210, as can best be seen in FIG. 10.

The output from the touch switch 222 for releasing the locked state of the time-setting function is applied to the clock input terminal $\phi$ of a modulo 3 counter 262 via an AND gate 260. The AND gate 260 also receives a fixed-period signal $\phi_1$ (1 Hz) from the divider 242. The output from the touch switch 222 is also supplied to the reset terminal R of the modulo 3 counter 262 through an invertor 264. The modulo 3 counter counts the time over which the touch switch 222 was touched and the Q signal output of the counter 262 is applied to the clock input terminal $\phi$ of a flip-flop circuit 266. The Q output of the flip-flop 266 is forwarded to the hour-setting switch position indicator element 234, the minute-setting switch position indicator element 236 and the lock-switch position indicator 238, all of which are located on the liquid crystal panel 230. The Q output signal of the flip-flop 266 is also applied to one input terminal of each of AND circuits 270, 272 and 280. The other input terminal of the AND gate 270 receives the signal from the hour-setting touch-switch 224; the other input terminal of the AND gate 272 receives the signal from the minute-setting touch-switch 226; and the other input terminal of the AND gate 280 receives the fixed-period signal $\phi_1$ (1 Hz) from the divider 242. The output from the AND gate 270 and a carry signal from the minute counter 246 are applied to an OR gate 248 connected with the hour counter 250; the output from the AND gate 272 and the fixed-period signal from the divider 242 are applied to an OR gate 244 connected with the minute counter 246; and the output from the AND gate 280 is applied to the clock input terminal $\phi$ of a modulo 30 counter 282 for controlling the time during which time-setting is possible. The reset input terminal R of the modulo 30 counter 282 receives, via an OR gate 284, the Q output signal from the flip-flop 266, the signal from the hour-setting switch 224 and the signal from the minute-setting switch 226. The Q output signal of the modulo 30 counter 282 is forwarded, together with the output of the lock-switch 228, to the reset terminal R of the flip-flop 266 via an OR gate 286.

Figure 12:
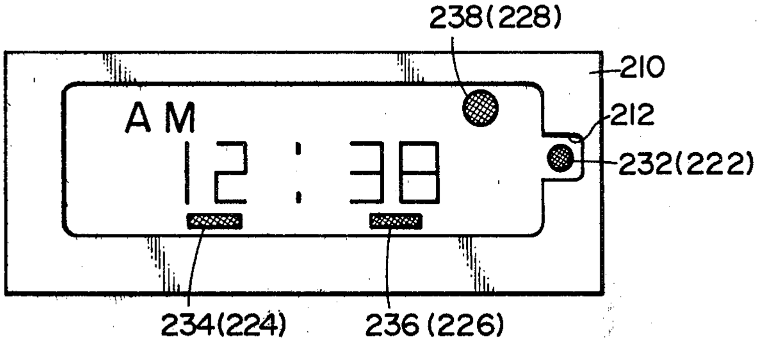
Figure 13:
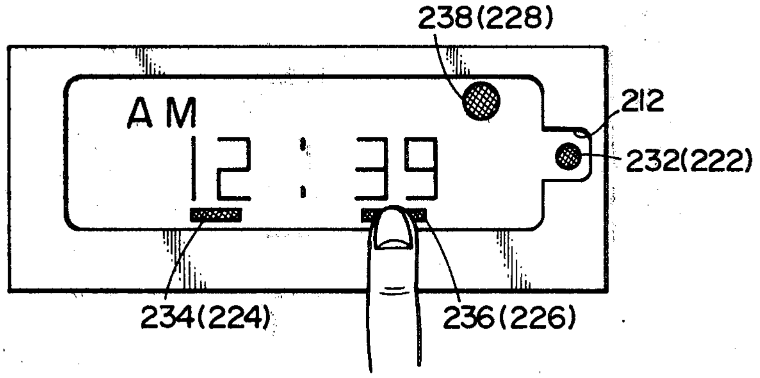

The operation of this circuit will now be described with reference to the clock displays shown in FIGS. 11–13.

Figure 11:
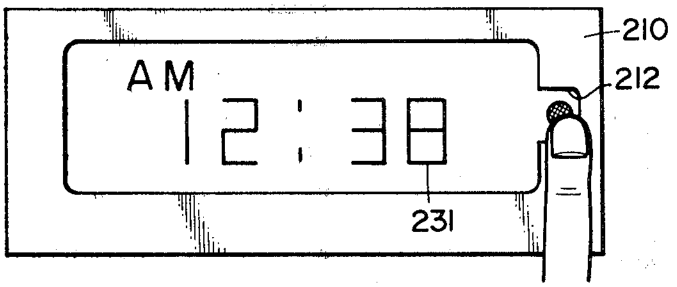

In the normal state as shown in FIG. 11, only the printed unlock-switch position indicator 232 and the time display 231 are visible. In this state, both the hour-setting touch-switch 224 and the minute-setting touch-switch 226 are inoperative. If, with the clock in this state, the users pushes his finger into the notch 212 and touches the touch switch 222 for releasing the locked state of the time-setting function, the output of the switch 222 will become H, the module 3 counter 262 will be freed from its reset state and the counting of the 1 Hz signal from the divider 242 will commence. After three seconds in this state, the Q output signal of the modulo 3 counter 262 rises from L to H, whereby the Q output signal of the flip-flop 266 becomes H and the $\overline{Q}$ output signal thereof becomes L. As a result, the hour-setting switch position indicator element 234, the minute-setting switch position indicator element 236, and the time-setting lock-switch position indicator element 238 (all located on the liquid crystal panel 230; see FIG. 12) are lit. At the same time, the AND gates 270 and 272 open, making the hour-setting touch-switch 224 and the minute-setting touch-switch 226 operative. Therefore, if the minute-setting touch-switch 226 is touched as shown in FIG. 13, one pulse will be output from the switch each time it is touched. These pulse signals are sent to the minute counter 246 via the AND gate 272 and the OR gate 244, whereby the minute reading of the clock is adjusted. In the same manner, the hour-setting touch-switch 224 causes the hour reading of the clock to advance by one hour for each time it is touched.

At the same time, the AND gate 280 opens so that the modulo 30 counter 282 is freed from its reset state and the count of the 1 Hz signal by the modulo 30 counter 282 begins. If in the course of this count, either the hour-setting touch-switch 224 or the minute-setting touch-switch 226 is operated, the count accumulated in the modulo 30 counter 282 is cleared and the count begins afresh. After thirty seconds have passed from the completion of the time setting (or, if no time setting was performed, from the time that time setting became possible), the Q output of the modulo 30 counter 282 rises from L to H, resetting the flip-flop 266. As a result, the Q output of the flip-flop 266 becomes L and the $\overline{Q}$ output thereof becomes H, closing the AND gates 270 and 272 and thus making the hour-setting touch-switch 224 and the minute-setting touch-switch 226 inoperative and at the same time turning off the hour-setting switch position indicator element 234, the minute-setting switch position indicator element 236 and the lock-switch position indicator element 238. Also, the AND gate 280 is closed, resetting the modulo 30 counter 282 and returning the display to the mode shown in FIG. 11.

Moreover, if the touch-switch 228 for locking the time-setting function is touched even before the modulo 30 counter 282 has completed its count, the time-setting function is made inoperative in the same manner as described above, the touch-switch position indicator elements are turned off and the display returns to that shown in FIG. 11.

In this embodiment of the invention, since the touch-switch 222 for releasing the locked state of the time-setting function is situated in the notch 212 in the clock case 210, there is very little danger of the user accidentally touching the switch 222 and thus causing the time-setting function to be made operative unintentionally. Also since the operative state of the time-setting function is not achieved unless the touch-switch for releasing the locked state is touched for at least three seconds, the likelihood of the time-setting operation occurring accidentally is even further reduced. Moreover, as the hour- and minute-setting switches and the lock-switch can also be touch switches, the clock adjustment switch system according to this embodiment can be fabricated at low cost. Still further, as the position indicator elements for showing the locations of the time-setting switches and the lock-switch are lit only during the period that time setting is possible, they do not interfere with the reading of the time under normal circumstances. On the other hand, they provide an indication as to whether or not time setting is possible.

Figure 14:
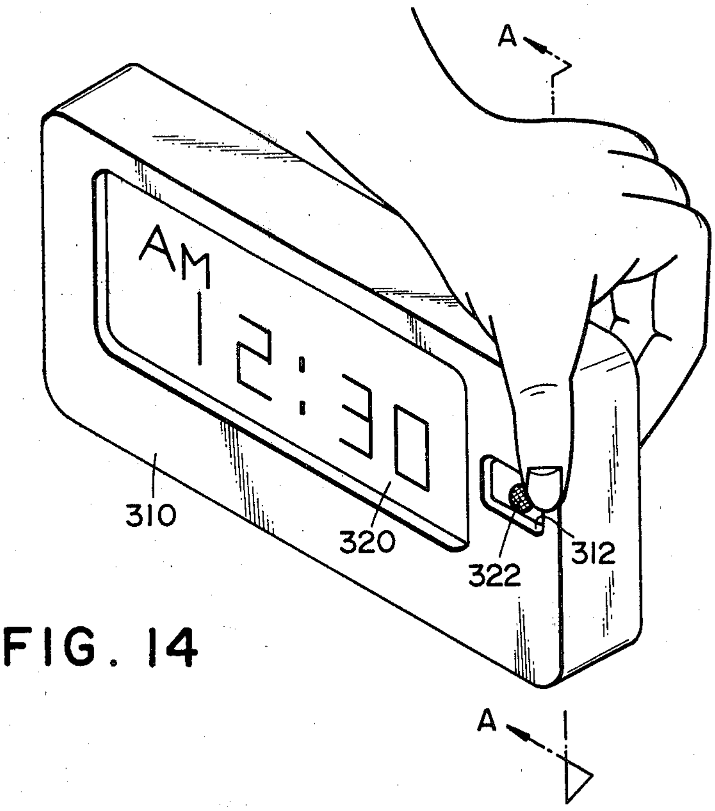
FIG. 14 is an external view of a clock incorporating another embodiment of this invention.
Figure 15:
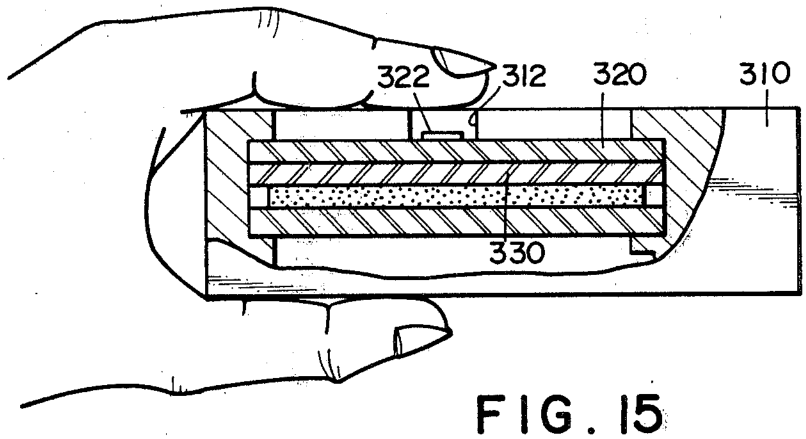
FIG. 15 is a cross-sectional view taken along line A—A in FIG. 14.

FIG. 14 is a perspective view of a clock incorporating another embodiment of the clock adjustment switch system of the present invention and FIG. 15 is a cross-sectional view of the same clock taken along the line A—A in FIG. 14. In this embodiment too the case 310 overlaps the periphery of the glass cover 320 provided over the liquid crystal panel 330. In this case, however, the case 310 is not provided with a notch but with a hole 312. The touch switch 322 for controlling the time-setting function of the clock is provided within the hole 312. As can be seen from FIGS. 14 and 15, the portion of the glass cover 320 exposed at the hole 312 is recessed to a depth equal to the thickness of the part of the case 310 overlapping the periphery of the cover glass 220. Therefore, even if the user places one of his fingers over the hole 312 when picking up the clock, his finger will not come in touch with the touch-switch 322 unless he deliberately pushes the tip of his finger into the hole since in the ordinary manner of grasping the clock, his finger will be prevented from reaching the switch by the thickness of the case 310, as can best be seen in FIG. 15.

What is claimed is:

1. A clock adjustment switch system for a clock having a display panel covered by a transparent cover, comprising:

a clock adjustment means for adjusting a function of said clock and having least one clock adjustment switch constituted as a transparent touch-switch provided on said transparent cover, a clock adjustment means control means for selectively making said clock adjustment means operative or inoperative, at least one luminous indicator means formed as a character or symbol provided on said display panel at a position corresponding to the position of said at least one clock adjustment switch, said luminous indicator means being lit to indicate the position of said clock adjustment switch only when said clock adjustment means control means makes said clock adjustment means operative.

2. A clock adjustment switch system as defined in claim 1, wherein said clock adjustment means control means comprises a touch-switch provided on said transparent cover.

3. A clock adjustment switch system as defined in claim 1, wherein said clock adjustment means control means comprises a transparent touch-switch provided on said transparent cover and a luminous indicator means formed as a character or symbol is provided on said display panel at a position corresponding to the position of said transparent touch-switch, whereby said luminous indicator means indicates the state of operation of said clock adjustment means control means and the position of the transparent touch-switch thereof.

4. A clock adjustment switch system as defined in claim 2, wherein the case of said clock is formed to overlap the periphery of said transparent cover and to have a notch at the edge of the overlapping portion, said touch-switch of said clock adjustment means control means being provided on said transparent cover at a position corresponding to the position of said notch.

5. A clock adjustment switch system as defined in claim 2, wherein the case of said clock is formed to overlap the periphery of said transparent cover and to have a hole in the overlapping portion, said touch-switch of said clock adjustment means control means being provided on said transparent cover at a position corresponding to the position of said hole.

6. A clock adjustment switch system as defined in claim 1, wherein the clock adjustment means control means automatically returns the clock adjustment means to its inoperative state if no adjustment is made within a fixed time after it was made operative.

* * * * *